(12) United States Patent
Spurlock

(10) Patent No.: US 6,841,098 B1
(45) Date of Patent: Jan. 11, 2005

(54) SPINNER DISC AND METHOD

(75) Inventor: Frank Spurlock, Richmond, IN (US)

(73) Assignee: Johns Nanville International, Inc., Denver, CO (US)

( * ) Notice: Subject to any disclaimer, the term of this patent is extended or adjusted under 35 U.S.C. 154(b) by 13 days.

(21) Appl. No.: 10/613,940

(22) Filed: Jul. 7, 2003

(51) Int. Cl.[7] .............................. B28B 1/54; B29B 9/00; B29C 47/00; C03B 37/04
(52) U.S. Cl. ................................ 264/8; 65/470; 65/521; 264/211.1; 264/211.11; 264/311; 425/8
(58) Field of Search ..................... 264/8, 211.1, 211.11, 264/311; 425/8; 65/470, 521

(56) References Cited

U.S. PATENT DOCUMENTS 6,453,703 B1 * 9/2002 Johnson et al. ........... 65/521 X

* cited by examiner

Primary Examiner—Leo B. Tentoni
(74) Attorney, Agent, or Firm—Robert D. Touslee

(57) ABSTRACT

A spinner disc for fiberizing a molten thermoplastic fiberizable material in a rotary fiberization process includes a base plate, an annular peripheral sidewall, and an upper annular reinforcing flange. The annular peripheral sidewall of the disc has a plurality of annular extending rows of fiberizing holes therein for fiberizing thermoplastic materials by centrifugal force. At least an uppermost row of the annular extending rows of fiberizing holes is interrupted by a plurality of spaced apart generally vertically extending holeless retaining bands for maintaining the upper annular reinforcing flange connected to the annular peripheral sidewall when the annular peripheral sidewall cracks along one of the annular extending rows of fiberizing holes due to the hole wear and enlargement that occurs during service.

30 Claims, 3 Drawing Sheets

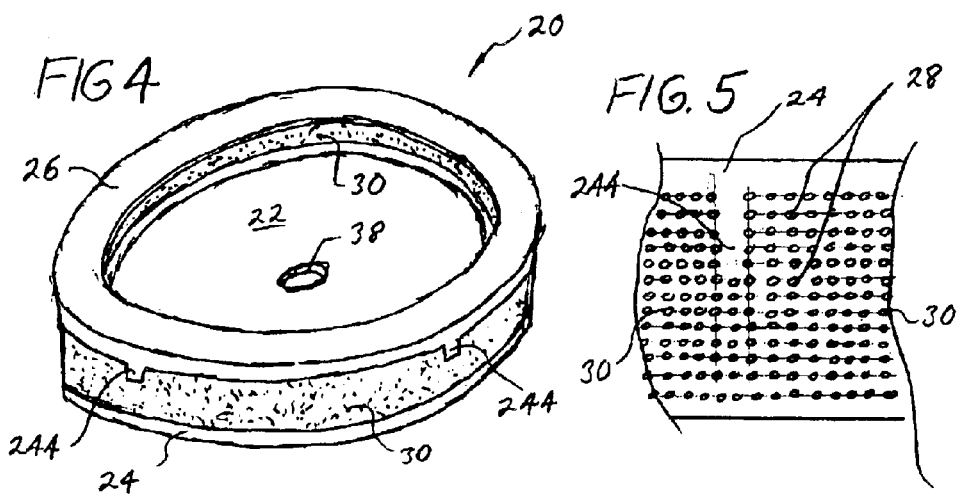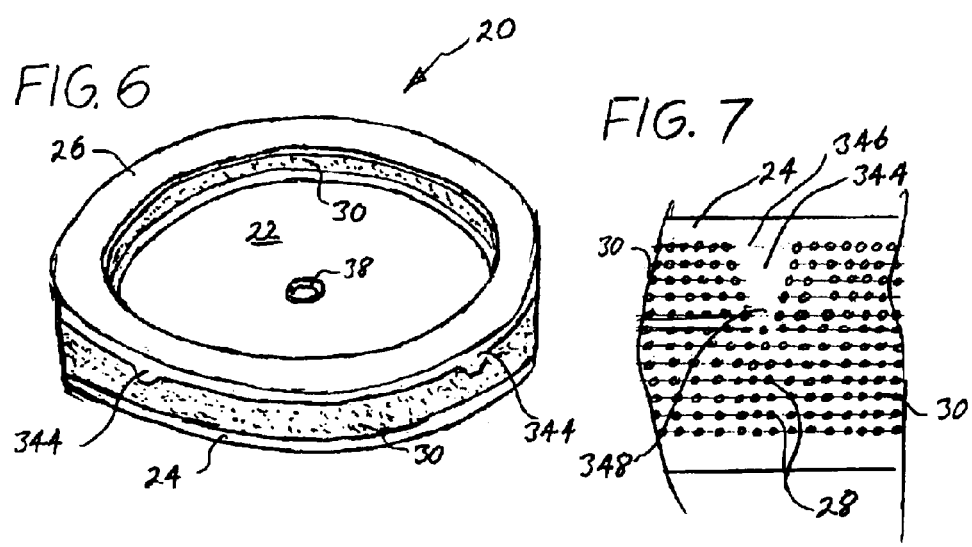

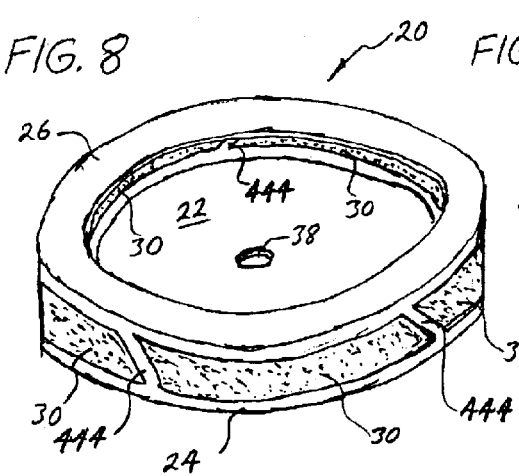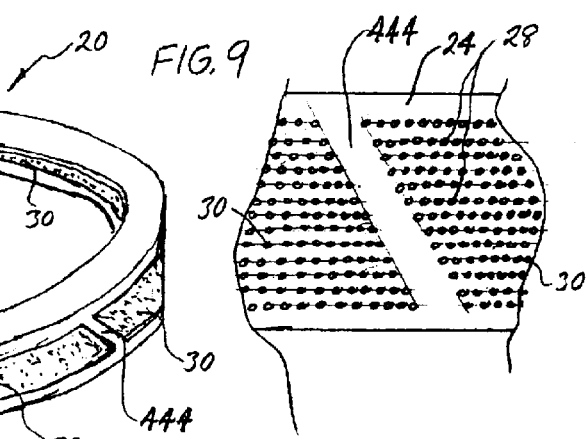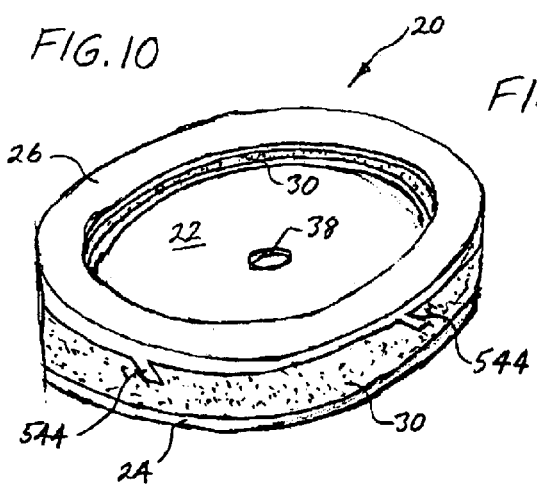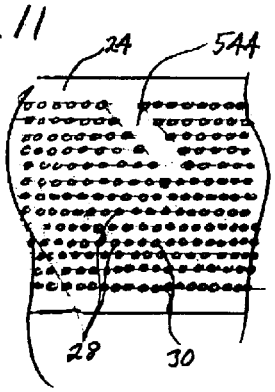

SPINNER DISC AND METHOD

BACKGROUND OF THE INVENTION

The present invention relates to a spinner disc and method for fiberizing molten fiberizable materials in a high temperature rotary fiberizing process, and, in particular, to a spinner disc and method for fiberizing molten fiberizable materials that prevents the separation of the upper portion of the spinner disc with its reinforcing flange from the remainder of the spinner disc when there is a rupture or other structural failure in the annular peripheral sidewall of the spinner disc along one or more rows of the fiberizing holes in the annular peripheral sidewall of the spinner disc.

High temperature rotary fiberization processes fiberize molten thermoplastic fiberizable materials by using centrifugal force to pass the molten thermoplastic fiberizable material through rows of fiberizing holes in an annular peripheral sidewall of a spinner disc. An example of such a process is a high temperature rotary glass fiberizing process wherein molten glass is typically fiberized at temperatures in excess of 1800° F. by passing the molten glass through rows of fiberizing holes in an annular peripheral sidewall of a spinner disc that is rotating at thousands of revolutions per minute. For good fiberization of the molten thermoplastic fiberizable materials in such a high temperature rotary fiberization process, the temperature of the spinner disc sidewall must be maintained high enough for proper glass flow through the fiberizing holes in the sidewall. Thus, for good fiberization sufficient heat must be delivered to the spinner disc sidewall and retained in the spinner disc sidewall to maintain even the cooler portions of the spinner disc sidewall at the minimum temperature desired for fiberization. In practice, the lower portion of the spinner disc sidewall that contains the lower rows of fiberizing holes operates at lower temperatures than the upper portion of the spinner disc sidewall that contains the upper rows of fiberizing holes. The higher operating temperatures present in the upper portion of the spinner disc sidewall cause the fiberizing holes in the upper portion of the spinner disc sidewall to wear and enlarge more rapidly than the fiberizing holes in the lower portion of the spinner disc sidewall. The wear and enlargement of the fiberizing holes in the upper portion of the spinner disc sidewall frequently cause the spinner disc sidewall to rupture, come apart or otherwise fail structurally along one or more of the upper rows of fiberizing holes and can result in the complete separation of the upper portion of the spinner disc with its reinforcing flange from the remainder of the spinner disc while the spinner disc is rotating at thousands of revolutions per minute. The potential for such failures at these high operational speeds and temperatures presents both operational and safety problems in a commercial production line. Thus, there has been and remains a need for preventing the separation of the upper portion of a spinner disc with its reinforcing flange from the remainder of the spinner disc during operation when there is a rupture or other failure in the annular peripheral sidewall of the spinner disc along one or more rows of the fiberizing holes in the annular peripheral sidewall of the spinner disc.

SUMMARY OF THE INVENTION

The spinner disc and method of operating the spinner disc of the subject invention prevents the separation of the upper portion of a spinner disc with its reinforcing flange from the remainder of the spinner disc during operation when there is a rupture or other structural failure in the annular peripheral sidewall of the spinner disc along one or more rows of the fiberizing holes in the annular peripheral sidewall of the spinner disc. The spinner disc of the subject invention for fiberizing molten thermoplastic fiberizable materials in a rotary fiberization process includes a base plate, an annular peripheral sidewall that extends upward from the outer peripheral edge of the base plate, and an upper annular reinforcing flange that extends radially inward from an upper edge of the annular peripheral sidewall. The annular peripheral sidewall of the spinner disc has a plurality of annular extending rows of fiberizing holes therein for fiberizing thermoplastic materials by centrifugal force. At least an uppermost row of the annular extending rows of fiberizing holes in the spinner disc sidewall is interrupted by a plurality of spaced apart generally vertically extending holeless retaining bands. When the annular peripheral sidewall of the spinner disc ruptures or otherwise fails structurally along one or more of the annular extending rows of fiberizing holes due to the wear and enlargement of the fiberizing holes that occurs during service, the generally vertically extending holeless retaining bands maintain the upper portion of the spinner disc with the upper annular reinforcing flange connected to the remainder of the spinner disc. In operation, when the spinner disc of the subject invention is operated until a structural failure develops along one or more of the annular extending rows of fiberizing holes in the spinner disc sidewall, the upper portion of the fiberizing disc remains connected to the remainder of the spinner disc and eliminates the operational and safety problems associated with the separation of the upper portion of the spinner disc from the remainder of the spinner disc when such a structural failure occurs.

BRIEF DESCRIPTION OF THE DRAWINGS

FIG. 4 is a perspective view of a spinner disc of the subject invention that has generally vertically extending holeless retaining bands extending only partially through the rows of fiberizing holes in the spinner disc sidewall.

FIG. 5 is a partial view in elevation of the spinner disc sidewall of FIG. 4, on a larger scale than FIG. 4, to better show one of the generally vertically extending holeless retaining bands in the spinner disc sidewall.

FIG. 6 is a perspective view of a spinner disc of the subject invention that has generally vertically extending holeless retaining bands extending only partially through the rows of fiberizing holes in the spinner disc sidewall. The holeless retaining bands of FIG. 6 have a configuration that differs from the configuration of the holeless retaining bands of FIGS. 4 and 5.

FIG. 7 is a partial view in elevation of the spinner disc sidewall of FIG. 6, on a larger scale than FIG. 6, to better show one of the generally vertically extending holeless retaining bands in the spinner disc sidewall.

FIG. 8 is a perspective view of a spinner disc of the subject invention that has generally vertically extending holeless retaining bands extending at a diagonal to the vertical and completely through the rows of fiberizing holes in the spinner disc sidewall.

FIG. 9 is a partial view in elevation of the spinner disc sidewall of FIG. 8, on a larger scale than FIG. 8, to better show one of the generally vertically extending holeless retaining bands in the spinner disc sidewall.

FIG. 10 is a perspective view of a spinner disc of the subject invention that has generally vertically extending holeless retaining bands extending at a diagonal to the vertical and only partially through the rows of fiberizing holes in the spinner disc sidewall.

FIG. 11 is a partial view in elevation of the spinner disc sidewall of FIG. 10, on a larger scale than FIG. 10, to better show one of the generally vertically extending holeless retaining bands in the spinner disc sidewall.

DESCRIPTION OF THE PREFERRED EMBODIMENTS

The spinner discs 20 of the present invention are especially suited for fiberizing molten thermoplastic fiberizable materials, such as but not limited to glass, into fibers in elevated temperature rotary fiberizing processes (e.g. processes operating at temperatures of about 1800° F. and greater). Preferably, the spinner discs 20 are made from various elevated temperature resistant alloys that form protective oxide films on their surfaces when exposed to the air or the atmosphere, such as but not limited to elevated temperature resistant stainless iron, nickel and cobalt alloys.

Figure 1:
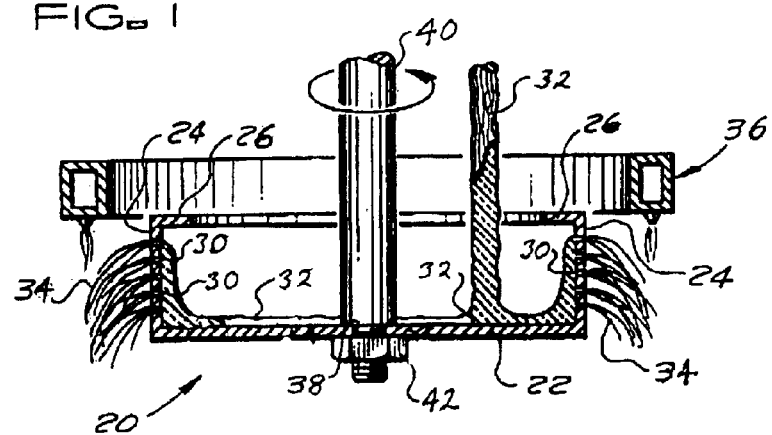
FIG. 1 is a schematic vertical cross section through a typical fiberizing station using the spinner disc and fiberizing method of the subject invention.

As shown in FIG. 1, a spinner disc 20 for fiberizing molten thermoplastic fiberizable materials in a rotary fiberizing process typically has a base plate 22, an annular peripheral sidewall 24, and an annular reinforcing flange 26. The annular peripheral sidewall 24 has a lower annular edge portion and an upper annular edge portion. The lower annular edge portion of the annular peripheral sidewall 24 is integral with and extends upward from an outer peripheral edge portion of the base plate 22. The annular reinforcing flange 26 is integral with and extends radially inward from the upper annular edge portion of the annular peripheral sidewall 24. The annular peripheral sidewall 24 contains a plurality of annular extending rows 28 (shown in FIGS. 2 to 11) of fiberizing holes 30 through which the molten thermoplastic fiberizable material 32, e.g. glass, is passed by centrifugal force to form glass fibers 34. The rows 28 of fiberizing holes 30 lie in planes that are parallel to or substantially parallel to a plane containing the base plate 22 of the spinner disc 20. Typically, the fibers 34 produced by passing the molten glass through the rows 28 of fiberizing holes 30 in the spinner disc sidewall 24 are further attenuated by an annular curtain of hot, high velocity products of combustion and/or a high velocity annular curtain of air, steam, etc., discharged from an annular burner or manifold assembly and/or an annular air ring 36.

The base plate 22 has a central bore 38 located on the rotational axis of the spinner disc 20. The spinner disc 20 is mounted on a drive shaft 40 which passes through the central bore 38 of the base plate and is damped or otherwise secured to the base plate 22, e.g. by a nut 42 or similar fastener threaded onto the drive shaft. The molten fiberizable material 32 is poured or otherwise introduced into the interior of the spinner disc and onto base plate 22. The centrifugal force caused by the rapid rotation of the spinner disc 20, which typically rotates at several thousand or more revolutions per minute, causes the molten thermoplastic fiberizable material 32 to flow outward from its point of introduction onto the base plate 22 and up the sidewall 24 of the spinner disc where the molten thermoplastic fiberizable material 32 passes out through the rows 28 of fiberizing holes 30 (normally thousands to tens of thousands of fiberizing holes) and is formed into fibers 34.

The spinner disc 20 for a high temperature rotary fiberizing operation, such as glass fiberizing operation, typically ranges from about 8 inches to about 75 inches in diameter; has a sidewall 24 that ranges from about ½ inch to about 4 inches in height; and contains thousands to tens of thousands of small diameter fiberizing holes 30 (e.g. holes 0.030 or less in diameter). The fiberizing holes are typically contained in from 2 to 50 annular rows 28. While a spinner disc 20 is in service, the fiberizing holes 30 in the rows 28 of fiberizing holes become progressively larger in diameter due to the erosive action of the molten fiberizable material on the fiberizing holes 30. As the spinner disc 20 approaches the end of its service life, the fiberizing holes 30 can become so enlarged that the sidewall 24 of the spinner disc 20 can rupture or otherwise structurally fail along one or more of the rows 28 of fiberizing holes 30 in the sidewall. As discussed above, like the spinner discs of the prior art, the upper portion of the spinner disc sidewall 24 of the spinner disc 20 normally operates at higher temperatures than the lower portions of the spinner disc sidewall 24. The higher operating temperatures in the upper portions of the spinner disc sidewall 24 relative to the lower portions of the spinner disc sidewall increase the erosive action of the molten fiberizable material on the fiberizing holes 30 in the upper portion of the spinner disc sidewall 24 relative to the erosive action of the molten fiberizable material on the fiberizing holes 30 in the lower portion of spinner disc sidewall. As a result of this greater erosive action in the upper portion of the spinner disc sidewall 24, the rupture or other structural failure in the sidewall 24 of the spinner disc 20 normally occurs in the uppermost one, two, or three rows 28 of fiberizing holes 30.

In the spinner disc 20, at least an uppermost annular extending row 28, preferably at least the uppermost three annular extending rows 28, and more preferably all of the annular extending rows 28 of fiberizing holes 30 are interrupted by a plurality of spaced apart generally vertically extending holeless retaining bands for maintaining the upper portion of the spinner disc including the annular reinforcing flange 26 connected to the annular peripheral sidewall 24 and thus the remainder of the spinner disc 20 when the annular peripheral sidewall 24 ruptures or otherwise fails structurally along one or more of the annular extending rows 28 of fiberizing holes 30 due to hole wear and enlargement that occurs during service. Preferably, the generally vertically extending holeless retaining bands are equidistantly spaced from each other about the circumference of the spinner disc sidewall 24. There are at least two generally vertically extending holeless retaining bands, preferably at least three generally vertically extending holeless retaining bands, and more preferably at least four generally vertically extending holeless retaining bands in the spinner disc 20.

Figure 2:
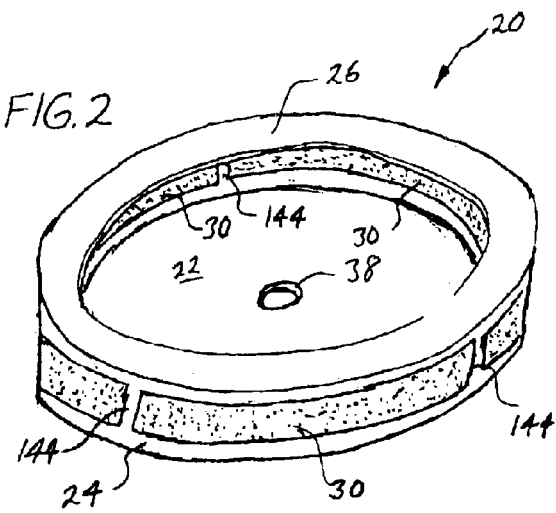
FIG. 2 is a perspective view of a spinner disc of the subject invention that has generally vertically extending holeless retaining bands extending completely through the rows of fiberizing holes in the spinner disc sidewall.
Figure 3:
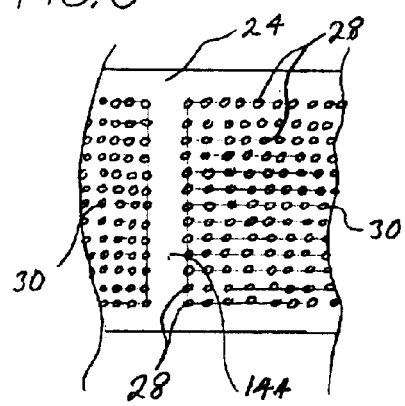
FIG. 3 is a partial view in elevation of the spinner disc sidewall of FIG. 2, on a larger scale than FIG. 2, to better show one of the generally vertically extending holeless retaining bands in the spinner disc sidewall.

FIGS. 2 and 3 show a first embodiment of the generally vertically extending holeless retaining bands that interrupt the rows 28 of fiberizing holes 30 in the sidewall 24 of the spinner disc 20. As shown in FIGS. 2 and 3, there are a plurality of generally vertically extending holeless retaining bands 144 for retaining the upper portion of the spinner disc 20, including the upper annular reinforcing flange 26, connected to the remainder of the spinner disc 20 when there is a rupture or other structural failure along one or more of the rows 28 of fiberizing holes 30 in the sidewall 24. The generally vertically extending holeless retaining bands 144 each extend completely through all of the rows 28 of fiberizing holes 30 including the uppermost row 28 and the lowermost row 28 of fiberizing holes 30.

FIGS. 4 and 5 show a second embodiment of the generally vertically extending holeless retaining bands that interrupt the rows 28 of fiberizing holes 30 in the sidewall 24 of the spinner disc 20. As shown in FIGS. 4 and 5, there are a plurality of generally vertically extending holeless retaining bands 244 for retaining the upper portion of the spinner disc 20, including the upper annular reinforcing flange 26, connected to the remainder of the spinner disc 20 when there is a rupture or other structural failure along one or more of the upper five rows 28 of fiberizing holes 30 in the sidewall 24. As shown, the generally vertically extending holeless retaining bands 244 each extend completely through the uppermost five rows 28 of fiberizing holes 30. While the generally vertically extending holeless retaining bands 244 are shown extending completely through the uppermost five rows 28 of fiberizing holes 30, the generally vertically extending holeless retaining bands 244 may be extended through more or less of the uppermost rows 28 of fiberizing holes 30, e.g. through three rows, four rows, six rows, ten rows, etc. The greater the number of rows 28 of fiberizing holes 30 that are interrupted by the generally vertically extending holeless retaining bands 244, the greater the number of rows 28 where a rupture or other structural failure can occur without having the upper portion of the spinner disc separate from the lower portion of the spinner disc at the rupture or other structural failure. The fewer the number of rows 28 of fiberizing holes 30 that are interrupted by the generally vertically extending holeless retaining bands 244, the fewer the number of rows 28 where a rupture or other structural failure can occur without having the upper portion of the spinner disc separate from the lower portion of the spinner disc at the rupture or other structural failure.

FIGS. 6 and 7 show a third embodiment of the generally vertically extending holeless retaining bands that interrupt the rows 28 of fiberizing holes 30 in the sidewall 24 of the spinner disc 20. The third embodiment of the generally vertically extending holeless retaining bands differs from the second embodiment of the generally vertically extending holeless retaining bands in that the retaining bands 344 become progressively narrower from their upper ends 346 to their lower ends 348. As shown in FIGS. 6 and 7, there are a plurality of generally vertically extending holeless retaining bands 344 for retaining the upper portion of the spinner disc 20, including the upper annular reinforcing flange 26, connected to the remainder of the spinner disc 20 when there is a rupture or other structural failure along one or more of the upper five rows 28 of fiberizing holes 30 in the sidewall 24. As shown, the generally vertically extending holeless retaining bands 344 each extend completely through the uppermost five rows 28 of fiberizing holes 30. While the generally vertically extending holeless retaining bands 344 are shown extending completely through the uppermost five rows 28 of fiberizing holes 30, the generally vertically extending holeless retaining bands 3144 may be extended through more or less of the uppermost rows 28 of fiberizing holes 30, e.g. through three rows, four rows, six rows, ten rows, etc. The greater the number of rows 28 of fiberizing holes 30 that are interrupted by the generally vertically extending holeless retaining bands 344, the greater the number of rows 28 where a rupture or other structural failure can occur without having the upper portion of the spinner disc separate from the lower portion of the spinner disc at the rupture or other structural failure. The fewer the number of rows 28 of fiberizing holes 30 that are interrupted by the generally vertically extending holeless retaining bands 344, the fewer the number of rows 28 where a rupture or other structural failure can occur without having the upper portion of the spinner disc separate from the lower portion of the spinner disc at the rupture or other structural failure.

FIGS. 8 and 9 show a fourth embodiment of the generally vertically extending holeless retaining bands that interrupt the rows 28 of fiberizing holes 30 in the sidewall 24 of the spinner disc 20. The fourth embodiment of the generally vertically extending holeless retaining bands differs from the first embodiment of the generally vertically extending holeless retaining bands in that the retaining bands 444 extend at a diagonal to the vertical (are inclined obliquely to the vertical). As shown in FIGS. 8 and 9, there are a plurality of generally vertically extending holeless retaining bands 444 for retaining the upper portion of the spinner disc 20, including the upper annular reinforcing flange 26, connected to the remainder of the spinner disc 20 when there is a rupture or other structural failure along one or more of the rows 28 of fiberizing holes 30 in the sidewall 24. The generally vertically extending holeless retaining bands 444 each extend completely through all of the rows 28 of fiberizing holes 30 including the uppermost row 28 and the lowermost row 28 of fiberizing holes 30.

FIGS. 10 and 11 show a fifth embodiment of the generally vertically extending holeless retaining bands that interrupt the rows 28 of fiberizing holes 30 in the sidewall 24 of the spinner disc 20. The fifth embodiment of the generally vertically extending holeless retaining bands differs from the second embodiment of the generally vertically extending holeless retaining bands in that the retaining bands 544 extend at a diagonal to the vertical (are inclined obliquely to the vertical). As shown in FIGS. 10 and 11, there are a plurality of generally vertically extending holeless retaining bands 544 for retaining the upper portion of the spinner disc 20, including the upper annular reinforcing flange 26, connected to the remainder of the spinner disc 20 when there is a rupture or other structural failure along one or more of the upper five rows 28 of fiberizing holes 30 in the sidewall 24. As shown, the generally vertically extending holeless retaining bands 544 each extend completely through the uppermost five rows 28 of fiberizing holes 30. While the generally vertically extending holeless retaining bands 544 are shown extending completely through the uppermost five rows 28 of fiberizing holes 30, the generally vertically extending holeless retaining bands 5144 may be extended through more or less of the uppermost rows 28 of fiberizing holes 30, e.g. through three rows, four rows, six rows, ten rows, etc. The greater the number of rows 28 of fiberizing holes 30 that are interrupted by the generally vertically extending holeless retaining bands 544, the greater the number of rows 28 where a rupture or other structural failure can occur without having the upper portion of the spinner disc separate from the lower portion of the spinner disc at the rupture or other structural failure. The fewer the number of rows 28 of fiberizing holes 30 that are interrupted by the generally vertically extending holeless retaining bands 544, the fewer the number of rows 28 where a rupture or other structural failure can occur without having the upper portion of the spinner disc separate from the lower portion of the spinner disc at the rupture or other structural failure.

In operation, the spinner disc 20 may be operated until a rupture or other structural failure develops along one or more of the annular extending rows 28 of fiberizing holes 30 in the spinner disc sidewall 24 interrupted by the plurality of generally vertically extending holeless retaining bands 144, 244, 344, 444, or 544. The generally vertically extending holeless retaining bands 144, 244, 344, 444, or 544 keep the upper portion of the fiberizing disc connected to the remainder of the spinner disc and eliminates the operational and safety problems associated with the separation of the upper portion of the spinner disc from the remainder of the spinner disc when such a structural failure occurs. The damaged spinner disc can then be cooled down, removed from service, and replaced with another spinner disc to continue the fiberization process.

In describing the invention, certain embodiments have been used to illustrate the invention and the practices thereof. However, the invention is not limited to these specific embodiments as other embodiments and modifications within the spirit of the invention will readily occur to those skilled in the art on reading this specification. Thus, the invention is not intended to be limited to the specific embodiments disclosed, but is to be limited only by the claims appended hereto.

What is claimed is:

1. A spinner disc for fiberizing a molten thermoplastic fiberizable material in a rotary fiberization process, comprising:
a base plate; the base plate having means for mounting the spinner disc on a drive shaft for rotating the spinner disc about an axis perpendicular to the base plate; the base plate having an outer annular peripheral edge portion; an annular peripheral sidewall having a lower annular edge portion and an upper annular edge portion; the annular peripheral sidewall extending upward from the outer annular peripheral edge portion of the base plate; the outer annular peripheral edge portion of the base plate being integral with the lower annular edge portion of the annular peripheral sidewall; an upper annular reinforcing flange extending radially inward from the upper annular edge portion of the annular peripheral sidewall; the upper annular reinforcing flange being integral with the upper annular edge portion of the annular peripheral sidewall; the annular peripheral sidewall having a plurality of annular extending rows of fiberizing holes therein for fiberizing thermoplastic materials by centrifugal force; the annular extending rows of fiberizing holes extending parallel to the base plate; and at least an uppermost row of the annular extending rows of fiberizing holes being interrupted by a plurality of spaced apart generally vertically extending holeless retaining bands for maintaining an upper portion of the spinner disc that includes the upper annular reinforcing flange connected to the annular peripheral sidewall when the annular peripheral sidewall fails structurally due to hole wear and enlargement that occurs during service along one or more of the annular extending rows of fiberizing holes interrupted by the generally vertically extending holeless retaining bands.

2. The spinner disc according to claim 1, wherein: the spaced apart generally vertically extending holeless retaining bands are equidistantly spaced from each other.

3. The spinner disc according to claim 1, wherein: there are three of the spaced apart generally vertically extending holeless retaining bands equidistantly spaced from each other.

4. The spinner disc according to claim 1, wherein: there are four of the spaced apart generally vertically extending holeless retaining bands equidistantly spaced from each other.

5. The spinner disc according to claim 1, wherein: the generally vertically extending holeless retaining bands extend through at least an uppermost three rows of the rows of fiberizing holes.

6. The spinner disc according to claim 5, wherein: the generally vertically extending holeless retaining bands are equidistantly spaced from each other.

7. The spinner disc according to claim 5, wherein: there are three of the spaced apart generally vertically extending holeless retaining bands equidistantly spaced from each other.

8. The spinner disc according to claim 5, wherein: there are four of the spaced apart generally vertically extending holeless retaining bands equidistantly spaced from each other.

9. The spinner disc according to claim 1, wherein: the generally vertically extending holeless retaining bands each extend through all of the rows of fiberizing holes.

10. The spinner disc according to claim 9, wherein: the generally vertically extending holeless retaining bands are equidistantly spaced from each other.

11. The spinner disc according to claim 9, wherein: there are three of the spaced apart generally vertically extending holeless retaining bands equidistantly spaced from each other.

12. The spinner disc according to claim 9, wherein: there are four of the spaced apart generally vertically extending holeless retaining bands equidistantly spaced from each other.

13. The spinner disc according to claim 1, wherein: the generally vertically extending holeless retaining bands extend at a diagonal to the vertical.

14. The spinner disc according to claim 13, wherein: there are four of the spaced apart generally vertically extending holeless retaining bands equidistantly spaced from each other.

15. The spinner disc according to claim 13, wherein: the generally vertically extending holeless retaining bands extend through all of the rows of fiberizing holes.

16. The spinner disc according to claim 13, wherein: the generally vertically extending holeless retaining bands are equidistantly spaced from each other.

17. The spinner disc according to claim 13, wherein: there are three of the spaced apart generally vertically extending holeless retaining bands equidistantly spaced from each other.

18. The spinner disc according to claim 13, wherein: there are four of the spaced apart generally vertically extending holeless retaining bands equidistantly spaced from each other.

19. A method of fiberizing molten thermoplastic fiberizable materials in a rotary fiberization process, comprising:
rotating a spinner disc; the spinner disc including a base plate, an annular peripheral sidewall, and an upper annular reinforcing flange; the base plate being mounted on a drive shaft for rotating the spinner disc about an axis perpendicular to the base plate; the base plate having an outer annular peripheral edge portion; the annular peripheral sidewall having a lower annular edge portion and an upper annular edge portion; the annular peripheral sidewall extending upward from the outer annular peripheral edge portion of the base plate; the outer annular peripheral edge portion of the base plate being integral with the lower annular edge portion of the annular peripheral sidewall; the upper annular reinforcing flange extending radially inward from the upper annular edge portion of the annular peripheral sidewall; the upper annular reinforcing flange being integral with the upper annular edge portion of the annular peripheral sidewall; the annular peripheral sidewall having a plurality of annular extending rows of fiberizing holes therein for fiberizing thermoplastic materials by centrifugal force; the annular extending rows of fiberizing holes extending parallel to the base plate; and at least an uppermost row of the annular extending rows of fiberizing holes being interrupted by a plurality of spaced apart generally vertically extending holeless retaining bands for maintaining an upper portion of the spinner disc that includes the upper annular reinforcing flange connected to the annular peripheral sidewall when the annular peripheral sidewall fails structurally due to hole wear and enlargement that occurs during service along one or more of annular extending rows of fiberizing holes interrupted by the generally vertically extending holeless retaining bands;

introducing a molten fiberizable material onto an upper surface of the base plate of the rotating spinner disc;

fiberizing the molten fiberizable material by passing the molten fiberizable material from the base plate radially outward through the annular extending rows of fiberizing holes in the annular peripheral sidewall of the rotating spinner disc; and continuing to operate the rotating spinner disc until a structural failure develops one or more of the annular extending rows of fiberizing holes.

20. The method of fiberizing molten thermoplastic fiberizable materials according to claim 19, wherein:

the generally vertically extending holeless retaining bands in the annular peripheral sidewall of the spinner disc are equidistantly spaced from each other.

21. The method of fiberizing molten thermoplastic fiberizable materials according to claim 19, wherein:

there are three of the spaced apart generally vertically extending holeless retaining bands in the annular peripheral sidewall of the spinner disc that are equidistantly spaced from each other.

22. The method of fiberizing molten thermoplastic fiberizable materials according to claim 19, wherein:

there are four of the spaced apart generally vertically extending holeless retaining bands in the annular peripheral sidewall of the spinner disc that are equidistantly spaced from each other.

23. The method of fiberizing molten thermoplastic fiberizable materials according to claim 19, wherein:

the generally vertically extending holeless retaining bands in the annular peripheral sidewall of the spinner disc extend through at least an uppermost three rows of the rows of fiberizing holes.

24. The method of fiberizing molten thermoplastic fiberizable materials according to claim 23, wherein:

the generally vertically extending holeless retaining bands in the annular peripheral sidewall of the spinner disc are equidistantly spaced from each other.

25. The method of fiberizing molten thermoplastic fiberizable materials according to claim 19, wherein:

the generally vertically extending holeless retaining bands in the annular peripheral sidewall of the spinner disc extend all of the way through the annular extending rows of fiberizing holes.

26. The method of fiberizing molten thermoplastic fiberizable materials according to claim 25, wherein:

the generally vertically extending holeless retaining bands in the annular peripheral sidewall of the spinner disc are equidistantly spaced from each other.

27. The method of fiberizing molten, thermoplastic fiberizable materials according to claim 19, wherein:

the holeless retaining bands in the annular peripheral sidewall of the spinner disc extend at a diagonal to the vertical.

28. The method of fiberizing molten thermoplastic fiberizable materials according to claim 27, wherein:

the generally vertically extending holeless retaining bands in the annular peripheral sidewall of the spinner disc extend through at least an uppermost three rows of the rows of fiberizing holes.

29. The method of fiberizing molten thermoplastic fiberizable materials according to claim 27, wherein:

the generally vertically extending holeless retaining bands in the annular peripheral sidewall of the spinner disc extend all of the way through the annular extending rows of fiberizing holes.

30. The method of fiberizing molten thermoplastic fiberizable materials according to claim 27, wherein:

the generally vertically extending holeless retaining bands in the annular peripheral sidewall of the spinner disc are equidistantly spaced from each other.

* * * * *